Figure 7:
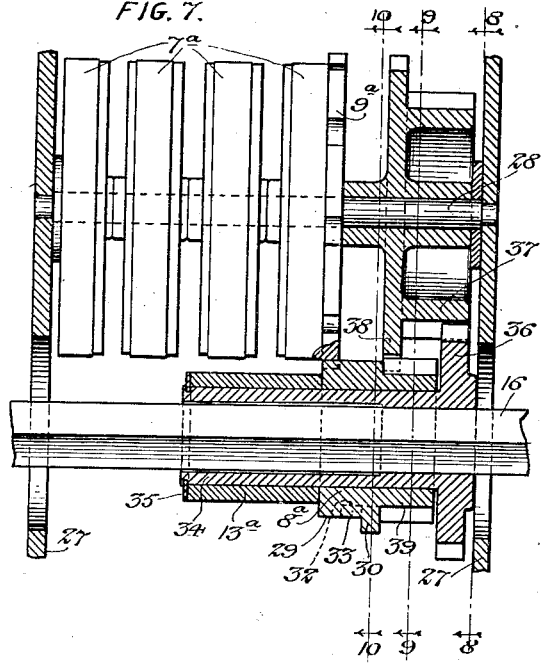

J. H. DEAN.
VOTING MACHINE.
APPLICATION FILED JUNE 17, 1907.
1,069,322.
Patented Aug. 5, 1913.
6 SHEETS—SHEET 1.
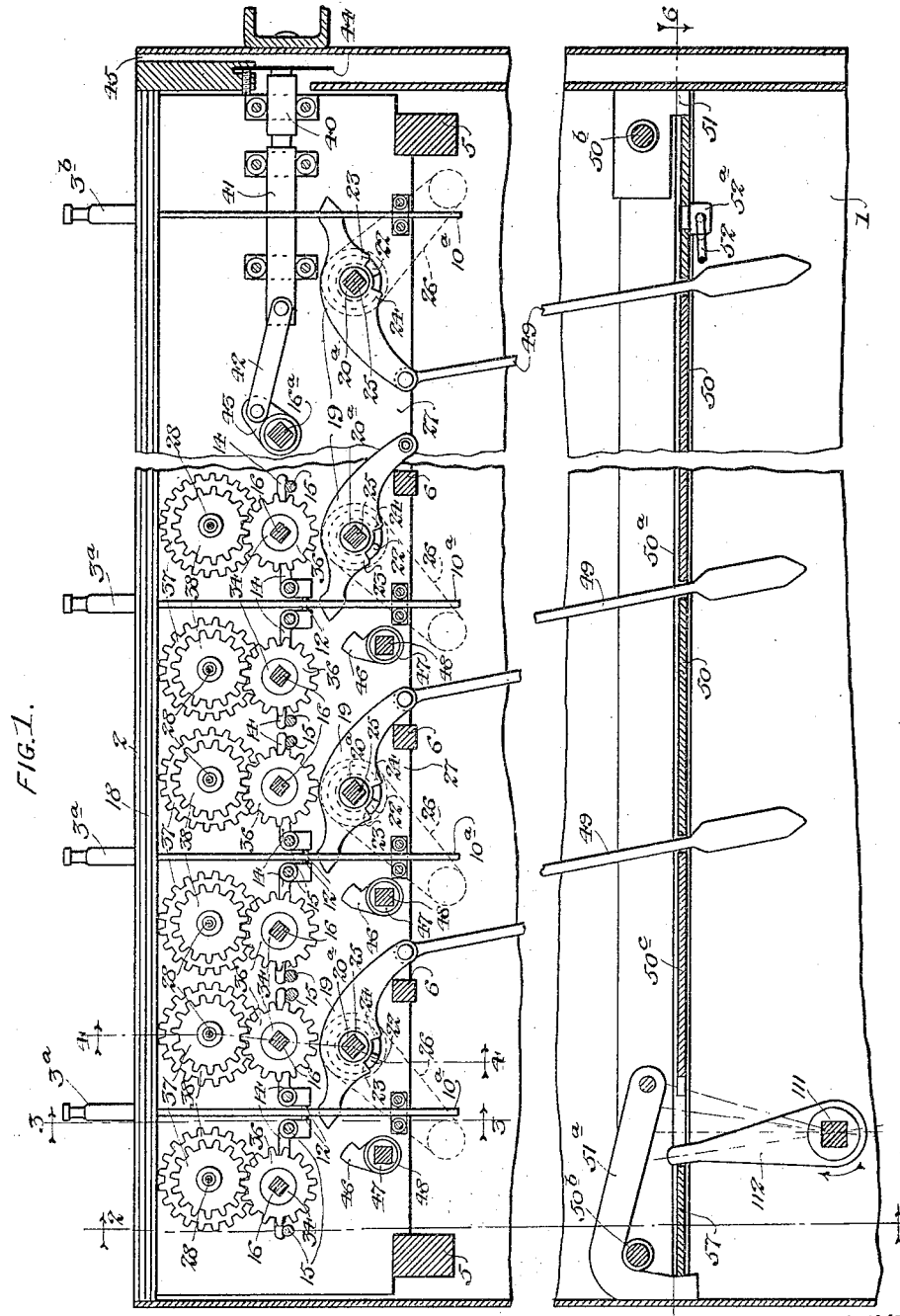
WITNESSES:—
INVENTOR:—
JAMES H. DEAN
BY
ATTORNEYS:—

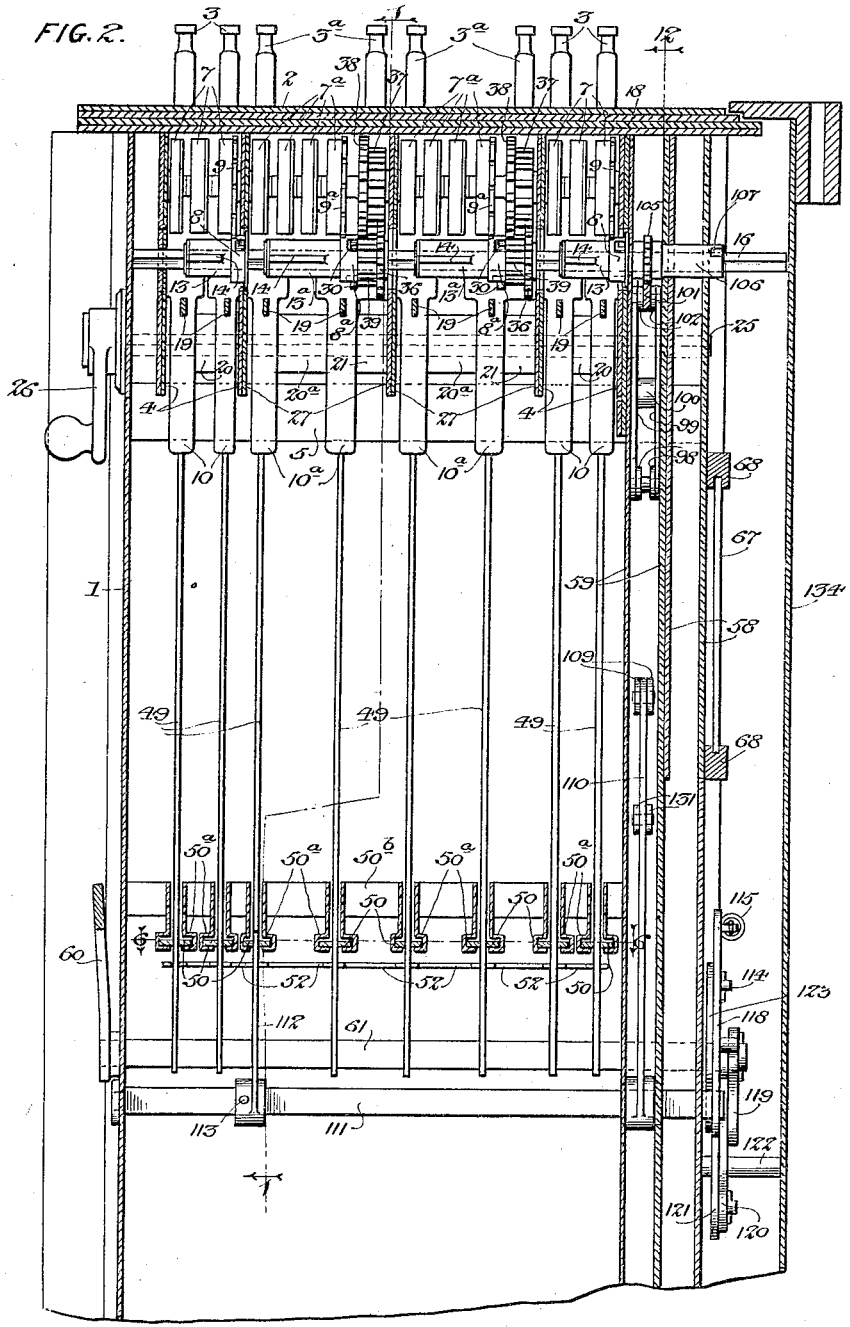

J. H. DEAN.
VOTING MACHINE.
APPLICATION FILED JUNE 17, 1907.
1,069,322.
Patented Aug. 5, 1913.
6 SHEETS—SHEET 3.
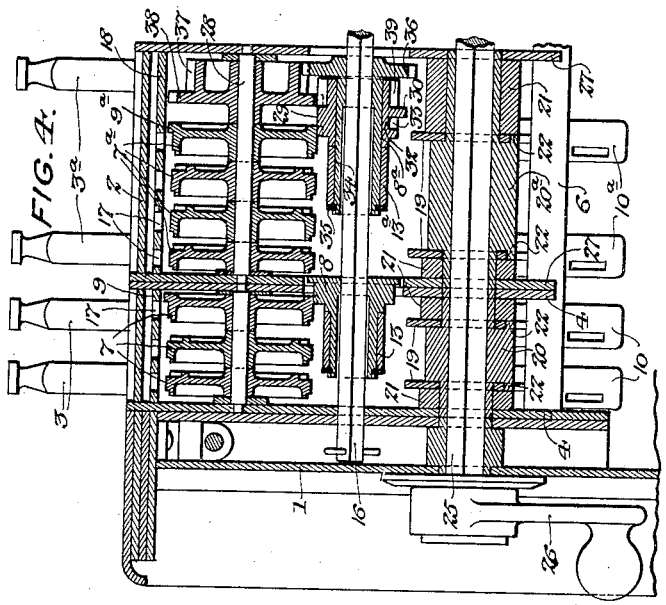
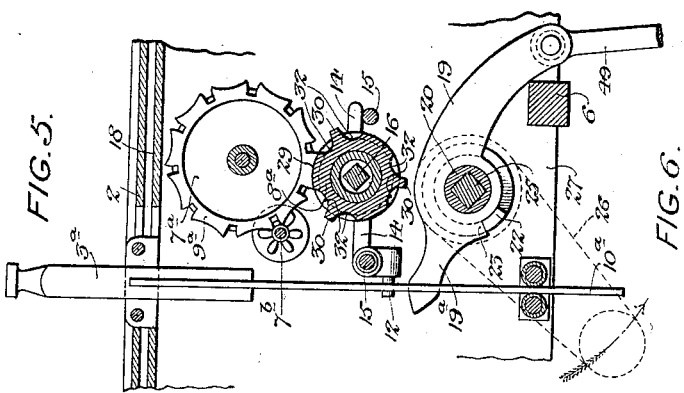
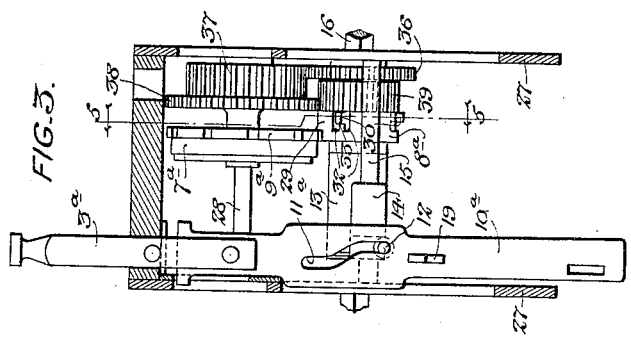
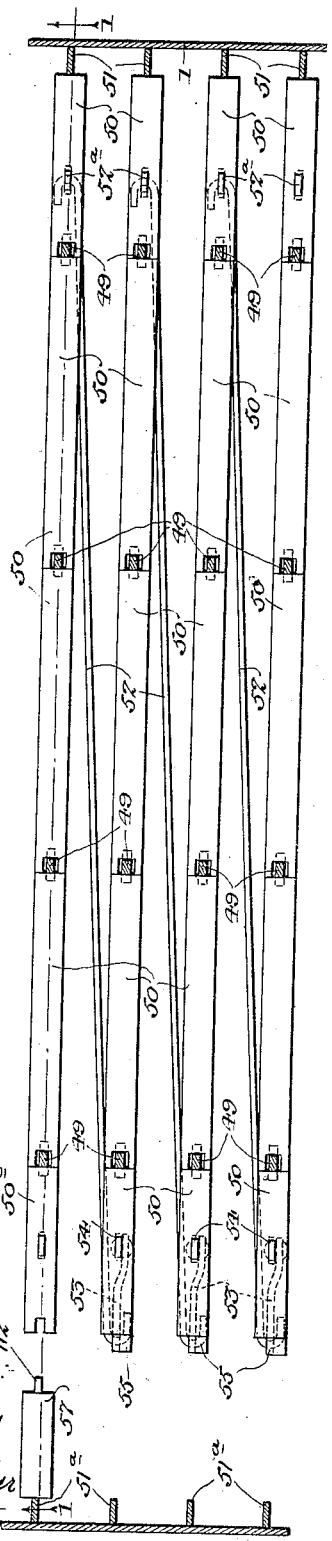
WITNESSES:—
INVENTOR
James H. Dean
BY Pierce & Fisher
ATTYS:—

J. H. DEAN.
VOTING MACHINE.
APPLICATION FILED JUNE 17, 1907.

1,069,322.

Patented Aug. 5, 1913.
6 SHEETS—SHEET 4.

WITNESSES:—
J. Jessen
[signature]

INVENTOR:—
James H. Dean
BY Peirce & Fisher
ATTORNEYS:—

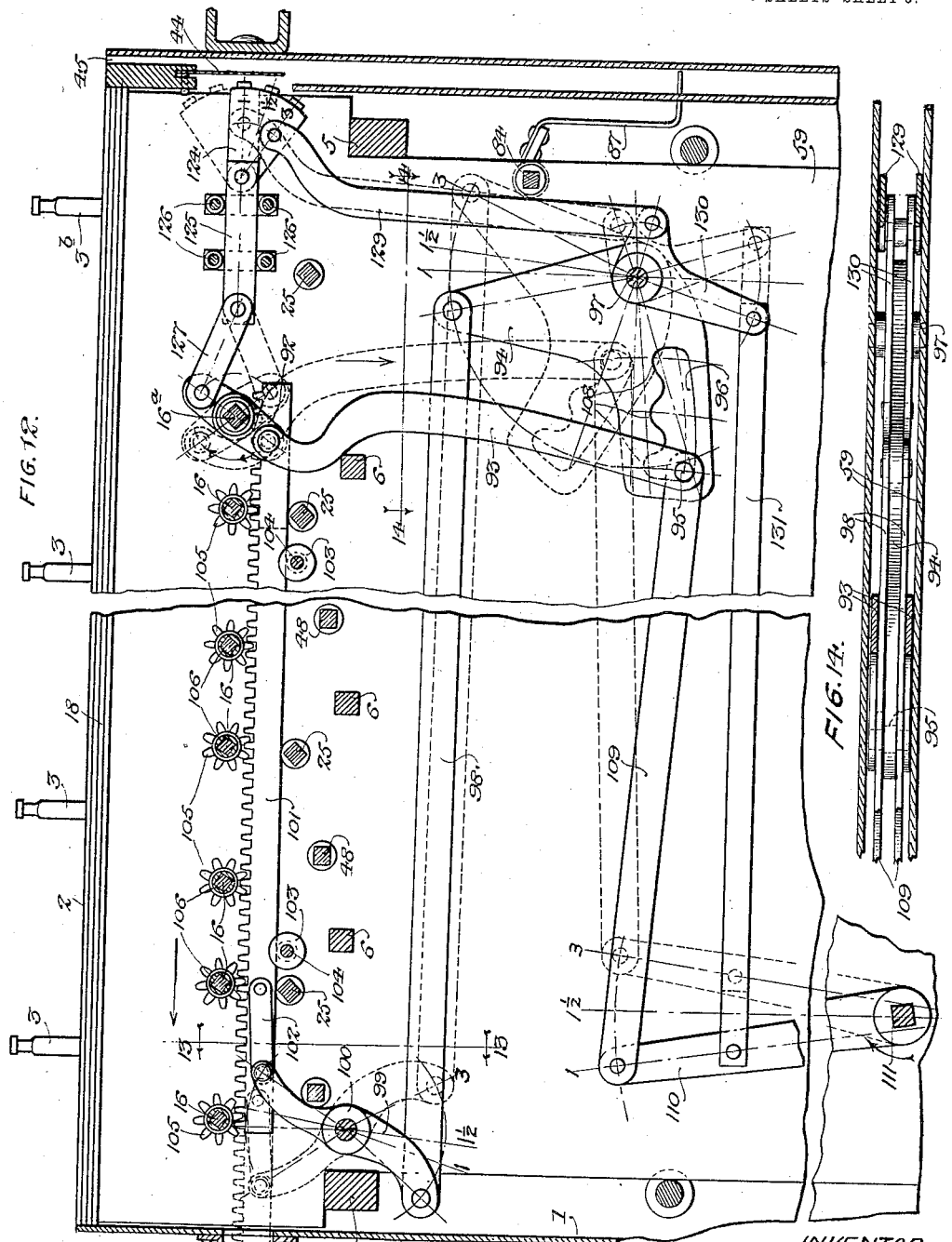

J. H. DEAN.
VOTING MACHINE.
APPLICATION FILED JUNE 17, 1907.
1,069,322.
Patented Aug. 5, 1913.
6 SHEETS—SHEET 6.
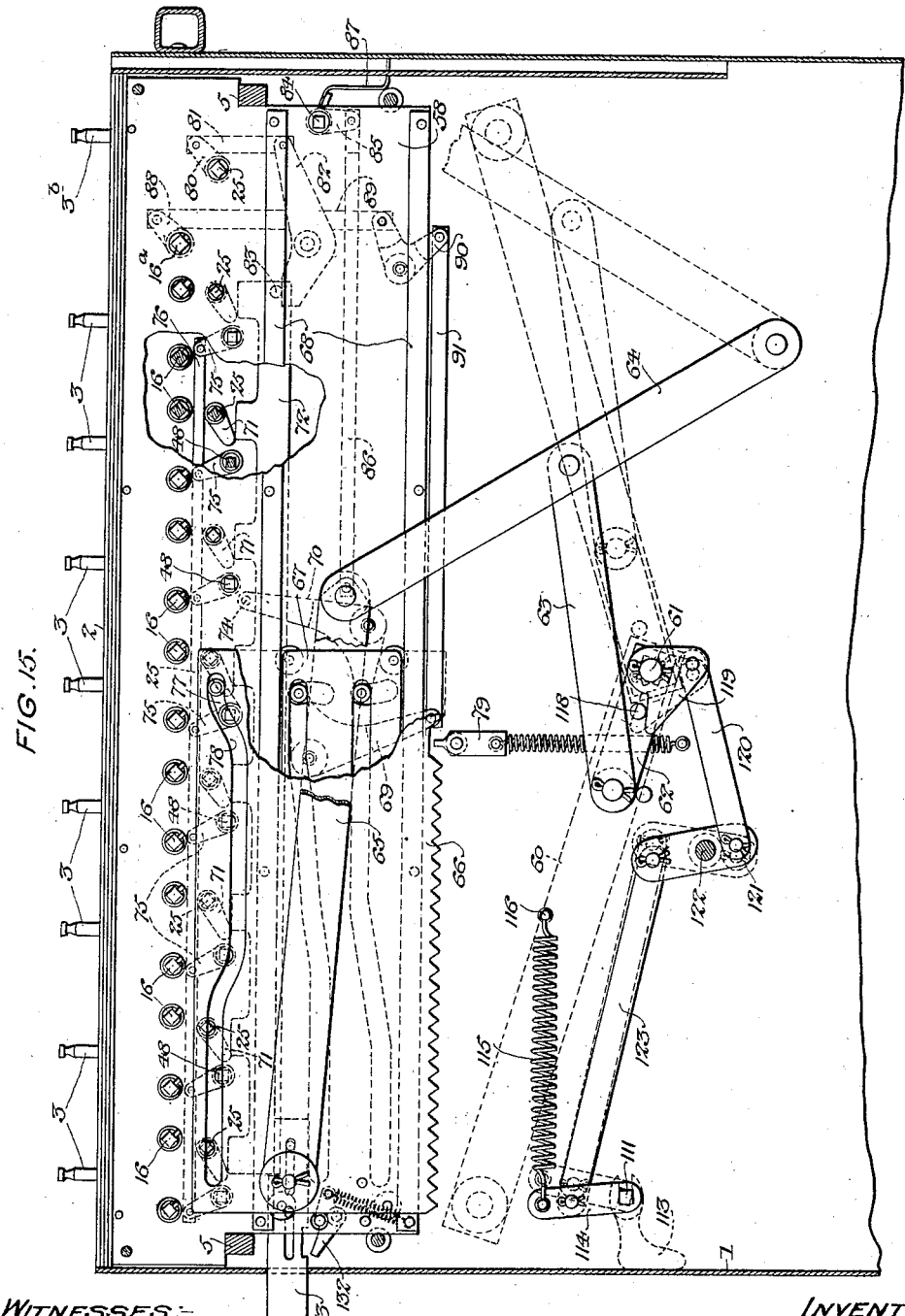

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,069,322. Specification of Letters Patent. Patented Aug. 5, 1913.

Application filed June 17, 1907. Serial No. 379,475.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines and more particularly to that type which carries on its face a series of ballot indicators or keys operable by the voter, with interlocking mechanism for preventing the operation of more than a proper number of keys by a single voter and with counters or registers controlled by the keys to indicate the number of votes cast for the several candidates.

In some of the States, more particularly the State of Illinois, and for certain offices such as that for assemblymen to the State legislature where a number of candidates are to be elected, the voter is entitled to cast all of his votes for a single candidate or to divide the same equally among a number of candidates. That is to say, in Illinois where three assemblymen are elected to the State legislature from each district at each election, the voter may cast three of his votes for a single candidate or give one and one-half votes to each of two candidates or give one vote to each of three candidates. Any other distribution of the votes is not permitted under the law as construed by the election officials. This particular method of voting is known as "cumulative" voting and the present invention seeks to provide simple and effective registering mechanism whereby the voter may give all of his votes to a single candidate or distribute the same, together with means for properly limiting the total number of votes which can be cast by a single voter.

In prior devices where the voter is entitled to cast different numbers of votes for one candidate, a series of voting devices or counters representing respectively different numbers of votes are employed for each candidate. In accordance with the present invention however, variably operable voting devices are employed and the invention comprises broadly variably operable voting devices or counters each adapted to record a different number of votes at each operation, together with suitable mechanism for limiting the total number of votes which may be cast by a single voter so that the voter may either give all of his votes to a single candidate or divide the same in accordance with the law.

The invention further comprises a series of variably operable voting devices arranged in multi-candidate group with controlling ballot indicators or keys, and interlocking mechanism for limiting the number of votes to be cast by a single voter for the candidates in the group, and mechanism variably operating in accordance with the number of keys selected by the voter for variably advancing the selected counters or voting devices one or more steps.

The invention further consists in the features of construction, combinations and arrangements of parts hereinafter set forth, illustrated in the accompanying drawings and more particularly pointed out in the appended claims.

The machine set forth in the drawings to which the invention is applied, is similar to that set forth in a prior application filed by me December 27, 1904, Serial No. 238,388. It will be understood however that the improvement can be adapted for use with other forms of machine without departure from the broad scope of the invention.

Figure 8:
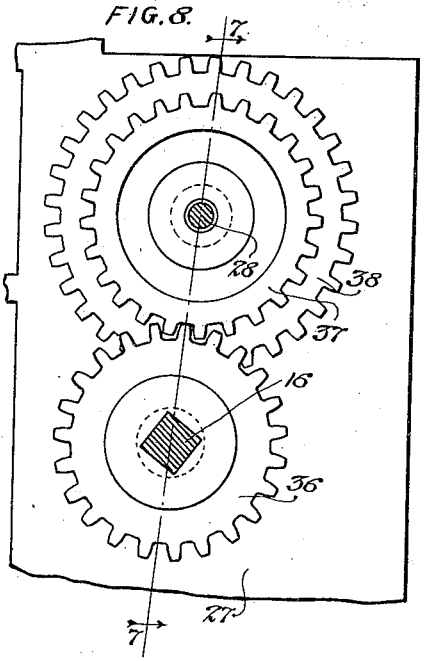
Figure 10:
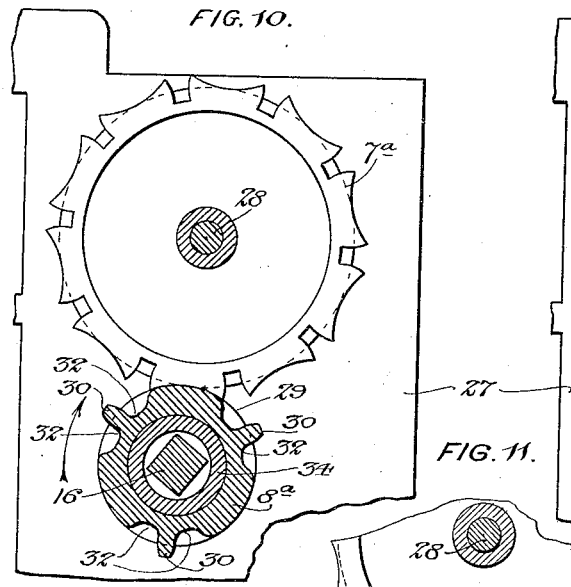
Figure 9:
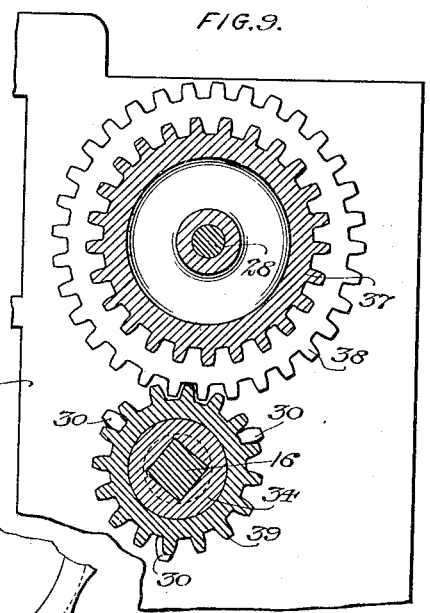
Figure 11:
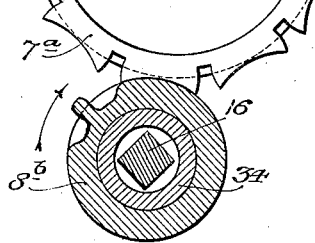

In the drawings, Figure 1 is a longitudinal section from side to side of the machine taken on the line 1—1 of Fig. 2 looking toward the front of the machine. Fig. 2 is a section from front to rear taken on the line 2—2 of Fig. 1. Figs. 3 and 4 are detail sections taken on the lines 3—3 and 4—4 respectively of Fig. 1. Fig. 5 is a section on line 5—5 of Fig. 3 showing a modified form of rocker arm. Fig. 6 is a diagrammatic plan view of the interlocking mechanism for the "cumulative" multi-candidate group, parts being shown in section on the lines 6—6 of Figs. 1 and 2. Fig. 7 is an enlarged detail view of the differential or variably operable counter. Figs. 8, 9 and 10 are detail sections taken on the lines 8—8, 9—9 and 10—10 respectively of Fig. 7. Fig. 11 is a detail section similar to Fig. 9, showing the modified form of counter actuator. Fig. 12 is a view in cross section through the rear of the machine on the line 12 of Fig. 2, illustrating a portion of the operating mechanism. Figs. 13 and 14 are detail sections on lines 13—13 and 14—14 respectively of Fig. 12. Fig. 15 is a rear view of the machine with the back plate removed and illustrating the main operating mechanism.

The machine comprises a box like frame or casing 1 having a top plate 2 which carries the names of the several candidates preferably arranged in party column. The vote indicators or keys 3 project through the ballot or top plate 2 and are correspondingly arranged in columns extending from front to rear of the machine. The office lines or rows extend across the face or top of the machine from side to side thereof.

The keys and counters of the machine for ordinary voting are similar to those set forth in the prior application referred to and are mounted in units or sections so that they may be readily assembled within the machine. These unit sections are formed of side plates 4 suitably connected together and mounted upon side bars 5 and intermediate bars 6 that extend from front to rear of the machine casing. Each of these sections or units is provided with two keys and the corresponding counters 7 therefor are arranged on opposite sides of the keys. Each of these counters comprises a set of wheels, as shown, representing respectively units, tens and hundreds and which are connected by any suitable sort of transfer pinions 7ᵇ (see Fig. 5). Rotary, single toothed, Geneva stop actuators 8 are arranged to engage intermittent gears 9ᵃ on the units wheels of the counters. The push keys 3 are provided with extensions or tail pieces 10 having cam slots 11 (see Fig. 3) which engage pins 12 of the actuator shifters or holders 13. These shifters are in the form of sleeves within which the actuators 8 are rotatably mounted and which are provided with projecting lugs 14 engaging the guide pins 15. The actuators and actuator shifters are axially movable upon the pins 15 and are shifted back and forth by the keys so that the teeth of the actuators are moved into and out of line with the gears 9ᵃ on the counters as the keys are shifted to and from voted position. The pins 12 with which the cam slots 11 of the keys engage, are fixed to depending portions on certain of the lugs 14 of the actuator supports or shifters 13.

The Geneva stop actuators are at all times interlocked with the counters so that the latter cannot be shifted except through the medium of the actuators. The teeth of the actuators are preferably normally out of line with the intermittent gears 9ᵃ of the counters and are shifted into line therewith when the corresponding key is depressed or shifted to voted position. The keys and actuators are freely movable to and from voted position so that the voter may correct or change his vote. The actuators are arranged in line and a series of shafts 16 extending therethrough are oscillated by suitable operating mechanism under control of the voter or judge of election, to advance the counters corresponding to the selected keys or indicators one step.

The frame or casing 1 may be designed for holding any suitable number of unit sections from front to rear and from side to side so that any suitable or desired number of columns of keys may be provided between the sides of the machine and each column or party series may have any desired number of individual candidate keys or indicators with their corresponding counters. The counters are read through suitable openings 17 in a plate 18 (see Fig. 4). Plate 18 is covered during the election by the ballot or name plate 2, but the counters are exposed to disclose the vote at the end of the election by the removal of the latter.

A series of rock arms 19 are provided, one for each of the ballot indicators or keys. As stated, the counters for a single column of keys are arranged on opposite sides thereof, but the rock arms for each column are arranged on the same side thereof with their ends engaging suitable openings in the keys below the cam slots 12. The two rock arms of each section are journaled upon the reduced ends of a hub 20, the ends of which are journaled in turn in suitable openings in the side plates 4 of the section. The two rock arms are spaced from the side plates by washers 21. The hub 20 is provided at one point adjacent its periphery with laterally projecting lugs 22, which extend within segmental notches formed in the central part of the lower edges of the rock arms and which are arranged to engage shoulders or lugs 23 and 24 on the rock arms to shift the latter in opposite directions. The hubs are provided with square openings and those corresponding to the different columns of keys are arranged in line to receive a series of locking and restoring shafts 25. These shafts are controlled by the operating mechanism and are held in normal position thereby with the lugs 22 on the hubs engaging the shoulders 23 on the rock arms to lock the latter and the keys or indicators 3 in their normal, uplifted or unvoted position. When the voter is admitted to the machine, these shafts are unlocked so that he may indicate his choice by depressing the keys or indicators corresponding to the candidates for whom he wishes to vote. As the voter leaves the machine the shafts 25 are oscillated by the operating mechanism to restore the keys and actuators to normal position shown in Fig. 1. The shafts 25 may also serve as straight ticket devices for shifting all of the keys or indicators in any one party column to voted position. For this purpose, these shafts are provided on their forward ends with party indicators or hand levers 26 by which the shafts may be oscillated when unlocked to bring the lugs 22 on the hubs into engagement with the shoulders 24 on the rock arms 19 to shift the keys or indicators of one column to voted position. As shown in Fig. 1, the distance between the shoulders 23 and 24 on the rock arms is greater than the width of the lug 22, so that a lost motion connection is provided intermediate the shafts 25 and rock levers 19. This lost motion must first be taken up before any of the shafts can operate to move all of the keys in the corresponding column, and this lost motion permits the independent shift of the individual keys, which would of course be prevented if the rock arms 19 are rigidly secured to the shafts.

It is often desirable to disconnect certain of the keys so that they will not be shifted to voted position by the straight ticket shaft for example, where a party has no nomination for a certain office. For this purpose a modified form of rock arm 19$^a$ (see Fig. 5) is provided in which the shoulder 24 is cut away so that the shift of the shaft through the medium of the straight ticket indicator or crank will not operate any of the keys connected to a rock arm of this form.

The counters or registers in the controlling mechanism for ordinary voting heretofore described, are similar to that set forth in the prior application No. 238,388 above referred to.

The variably operable voting devices for "cumulative" voting are mounted in the upper portion of the frame of the machine in line with the counter sections described. These voting devices are also preferably arranged in sections so as to be readily assembled within the machine, and are located in any desired position therein. The frames for these sections preferably extend the entire width of the machine and comprise side plates 27 which rest at their ends upon the cross bars 5 and at intermediate points upon side bars 6. The plates of each section are connected together and suitably spaced apart by transverse stay-pins arranged at intervals. These special sections and the ordinary sections are assembled within the machine upon the bars 5 and 6 and abut against one another, as shown in Fig. 2. The special sections may be located at any point from front to rear of the machine in accordance with the location desired for them upon the ballot or ticket. Each of these special sections carries a number of ballot indicators or keys 3$^a$ arranged in pairs or in two rows. These keys are properly arranged in line within the several columns or party groups of keys of the machine and are similar in construction to the keys 3 of the ordinary counter sections, except that the keys of each pair are spaced somewhat farther apart from each other, as shown, and their tail pieces 10$^a$ are somewhat differently shaped. The counter wheels 7$^a$ corresponding to each pair of keys are arranged on opposite sides thereof and are mounted upon a shaft or pin 28 extending between the side plates 27 of the section. These counter wheels are similar in all respects to the wheels of the ordinary counters, except that a fourth or thousands wheel is added. The rotary Geneva stop actuators 8$^a$ for these counters are each provided (see Figs. 7 and 9) with a cylindrical locking surface 29, and in the particular form shown, with a series of three teeth 30 which are arranged to engage with an intermittent gear 9$^a$ upon the units wheel of the counter. The locking surface 29 is located at the pitch line of the gear teeth 30 so that recesses 32 are formed in the surface of the actuator opposite the teeth 30. These recesses (see Fig. 3) are double the width of the teeth 30 and are separated beyond the latter by short half-teeth 33 extending to the pitch line of the actuator. The actuator 8$^a$ is rotatably mounted upon a hub or sleeve 34 which is rotatably mounted within the sleeve of the actuator shifter or support 13$^a$. This sleeve extends between the actuator and a washer 35 fixed to the end of the hub or sleeve 34 and is provided (see Figs. 1 and 3) with projecting lugs 14 engaging cross pins 15 which extend between the side plates 27 of the sections. The teeth 30 of the actuators are normally out of line with the gears 9$^a$ on the counters but are shifted axially into line therewith by means of cam slots 11 formed in the tail pieces 10$^a$ of the keys 3$^a$ which engage pins 12 of the actuator supports or shifters 13$^a$. These pins are fixed to depending portions on certain of the lugs 14 of the actuator shifters. These actuators, like those of the ordinary counters, are thus shifted in axial direction into and out of operative relation with the corresponding counters by the keys as they are moved to and from voted position. The keys are freely movable to and from voted position so that the voter may correct or change his vote. The actuators are also arranged in line with the actuators of the ordinary counters and the shafts 16 extend through square portions of the hubs or sleeves 34. These hubs are each provided at one end with a gear 36 meshing with a gear 37 on the shaft or pin 28 of the corresponding counter and a gear 38 connected to or formed in piece with the gear 37 meshes with a gear 39 connected to or formed in piece with the actuator 8$^a$. In the form shown, the gears 37 and 36 are of the same size, while the gear 38 is twice as large as the gear 39, so that the actuator shafts 16 and actuators 8$^a$ are geared together in the ratio of one to two; that is to say, a single revolution of the actuator shafts will effect two revolutions of the actuator 8$^a$ and, since the actuator is provided with three teeth the units wheel of the corresponding counter will be advanced six steps by a single complete revolution of the corresponding actuating shaft. The operating mechanism is arranged to variably actuate the shafts 16 through one-third or one-half of a revolution, or through a complete revolution to actuate the counters, as hereinafter described. The locking and restoring shafts 25 extend through these special sections, as shown, and are provided with hubs 20$^a$ that are similar in all respects to the hubs 20, except that they are of slightly greater width. The rock arms 19 upon the hubs 20 and 20$^a$ are similar for both the regular and for the "cumulative" voting keys, except that certain of the keys 3$^a$ in the "cumulative" group are provided with rock arms 19$^a$, such as shown in Fig. 5, so that they cannot be operated by the straight ticket or party indicators.

The special sections for "cumulative" voting are provided at one end with irregular voting mechanisms which, in the form shown, comprise impression devices or printers 40 controlled by sliding actuators 41. These actuators are connected by links 42 to cranks 43, the hubs of which are journaled between the side plates 27 and through which hubs extends an enlarged actuator shaft 16$^a$. The keys or indicators 3$^b$ for the irregular voting mechanisms are arranged to operatively connect and disconnect the actuators 41 and the printers 40 as they are shifted to and from voted position. The restoring rock arms 19, hubs 20 and locking and restoring shafts 25 for the irregulate candidate keys 3$^b$ are similar in construction to those of the other keys, except that they are reversely arranged, as shown. The keys 3$^b$ do not actuate the printers 40 but merely serve, as stated, to connect and disconnect them with the corresponding printing actuators 41, so that the keys are freely shiftable to and from voted position to correct or change a vote. The printers coöperate with an inking ribbon 44 supported in the machine outside their ends to mark a suitable paper ballot inserted into the slot 45 at one side of the machine upon which the names of the irregular candidates are written by the voter. Similar mechanisms are also associated with the other rows of keys in the machine and are used for voting for candidates not regularly nominated and whose names do not appear upon the face of the machine. This irregular voting mechanism is described in the prior application filed by me July 25, 1905, Serial No. 271,216, which application sets forth the construction in detail.

A series of dogs or pawls 46 are mounted upon hubs 47 that are journaled between the side plates 27 of the sections. These hubs are provided with square openings through which shafts 48 extend. The dogs or pawls 46 are arranged opposite the ends of the rock arms 19 and the shafts 48 are oscillated by the operating mechanism to bring the dogs or pawls 46 into engagement with the ends of the rock arms 19 to complete the movement of any partially depressed key or keys or to restore any key or keys which have been depressed sufficiently to set the associated actuators and interlocking spreaders. This mechanism is fully set forth in detail in an application filed by me April 1, 1907, Serial No. 365,639.

The number of keys or indicators, both regular and irregular, and those employed for "cumulative" voting, which may be operated by a single voter, is properly limited by suitable interlocking mechanism, which in the form shown, comprises a pair of swinging arrows or spreaders 49 which are pivoted at their upper ends to the tail portions of the rock arms 19 of the several ballot indicators or keys, and which extend downwardly between the interlocking slides or blocks 50. These blocks are arranged in rows, one row for each office line and are mounted slidably in suitable supporting guides or channels 50$^a$ which are secured at their ends to cross rods 50$^b$ extending from front to rear of the machine. By shifting any one of the keys or indicators, the corresponding arrows or spreaders will be drawn up through the medium of the rock arm connected thereto to bring its enlarged lower end or spreader portion into line with the lower blocks to spread the same. By suitably limiting the spread or movement of the rows of blocks, the number of spreaders which may be drawn up and the number of associated keys which can be shifted to voted position will be properly limited. By connecting two or more rows of blocks two or more office lines of mechanisms may be thrown into a multi-candidate group.

Each supporting guide or channel is provided at one end with a stop lug 51 and at its opposite end with a pivoted hook 51$^a$, both of which extend downwardly into line with the rows of blocks in the channel. The rows of blocks are connected and disconnected for grouping them for different elections by means of a series of tie-rods 52. There is one of these tie-rods between each pair of adjacent rows of blocks and pivotally connected at one end to a lug 52$^a$ on the end block of one row and to a hook 53 that is pivoted to a lug 54 on the opposite end block of the next adjacent row. The hooks 53 are provided on their ends with off-set lugs 55 which may be arranged either in or out of the corresponding channel or supporting guide. When the hook 53 at the end of one row has its lug 55 in the channel, that and the next adjacent row will be connected together. Any number of rows may thus be connected and the movement of the entire connected group properly limited by means of the stop 50 at one end and by a suitable spacer block, such as shown at 57 in Fig. 6, interposed between the other end block of the group and the adjacent hook 51. The four rows of blocks corresponding to the rows or lines of keys 3ª and 3ᵇ, employed for "cumulative" voting are grouped together, as shown in Fig. 4, and the spacer block 57 at the end of the group is of such length that, in the particular instance shown, three of the keys may be operated by a single voter. The interlocking mechanism described is set forth in detail in a companion application filed by me June 17, 1907, Serial No. 379,474.

The controlling or operating mechanism (see Figs. 2, 12, 13, 14 and 15) is arranged in a main and supplemental operating sections at the rear of the machine. The main section is formed of plates 58 and the supplemental section of the side plates 59. Both sets of plates extend the full width of the machine and are supported at their ends upon the side bars 5. A main operating lever or handle 60 is mounted at the front of the machine outside of the frame or casing and upon the front end of a shaft 61. This shaft extends rearwardly through the main and through the supplemental operating sections. Its rear end projects beyond the main operating section 58 and is provided with a rigid crank arm 62 connected by a link 63 to a swinging lever 64 pivoted at its lower end to the outer plate 58 of the main operating section. This lever 64 is connected at its upper end by a link 65 to a sliding carriage comprising a ratchet plate 66 and a cam plate 67 secured thereto. The cam plate is mounted to slide between guides 68 upon the back of the main operating section and is provided with two cam slots for oscillating the bell crank levers 69 and 70 as the carriage is shifted back and forth from side to side of the machine. The main operating section has the bell cranks 69 and 70 and a series of rock arms 71 journaled between the plates 58 thereof and the arms 71 engage the ends of the locking and restoring shafts 25. These rock arms are arranged to be engaged by lugs upon a sliding locking and restoring bar 72. This locking and restoring bar is shifted in one direction to release the locking and restoring shafts and the voter's keys by means of a sliding intervening bar 73 which projects through an opening in the casing at the rear of the machine, and is under the control of the judge or other officer in charge of the election. The locking and restoring bar 72 is shifted in the other direction to lock the keys by the engagement of a pin 74 upon the end of the bell crank 70 with one of the lugs on the bar. A series of rock arms 75 journaled in the main operating section, engage the ends of the dog operating shafts 48 and are connected together by a common bar or link 76. One of these crank arms is provided with an extended portion having a crank 77 engaging a cam slot 78 in the upper edge of the ratchet plate 60. The lower edge of the plate 60 is provided with ratchet teeth which are engaged by a full-stroke pawl 79 to compel the complete shift of the carriage and operating mechanism in one or the other direction.

The locking and restoring shaft 25 at one side of the machine, which is connected to the irregular ballot indicators or keys, engages at its rear end, a crank arm 80 that is journaled between the plates 58 of the main operating section. This crank arm is connected by a link 81 to a lever 82 that is pivoted between its ends in the main operating section. A pin 83 upon the locking and restoring bar 72 engages one end of the lever 82 and normally holds the irregular ballot indicators or keys in locked position. When the bar 72 is shifted to release the other keys of the machine, pin 83 is moved to release the lever 82 and the irregular ballot indicators or keys controlled thereby. The return movement of the bar 72 effected by the bell crank 70, will restore any of the irregular keys which may have been set in voted position and will lock them in such position until the next voter is admitted to the machine.

A shaft 84 journaled in the machine below the irregular voting mechanisms projects through the main operating section and engages a crank arm 85 journaled therein that is connected by a link 86 to the bell crank 70. Shaft 84 is provided with a series of fingers 87 which are arranged to project within the slot 45 in which the irregular ballot is deposited by the voter. When the voter is admitted to the machine the bell crank 70 is moved to shift the shaft 85 through the connecting link 86 and project the fingers 87 into the slot 45, as shown in Fig. 15, so that an irregular ballot deposited in the slot 45 by the voter will be sustained in position by the fingers 87 to be operated upon by the impression or printing devices 40 of the irregular voting mechanisms. When the voter leaves the machine the movement of the bell crank 70 withdraws the fingers 87 so that the ballot falls through the slot 45 into the lower face portion of the machine frame.

The actuator shaft 16ª which operates the irregular ballot printers, projects into the main operating section and engages a crank arm 88 journaled between the plates 58 thereof. This arm is connected by a downwardly extending link 89 to a bell crank 90 journaled in the main operating section and the latter is connected by a link 91 to the end of the operating bell crank 69. The linkage is such that, in the particular form shown, the actuator shaft 16<sup>a</sup> will be oscillated through one-third of a revolution as the carriage is shifted back and forth to reciprocate the printer actuators 41 and operate the impression devices or printers 40 corresponding to the irregular ballot indicators or keys which have been left by the voter in depressed or voted position.

Within the supplemental operating section is journaled a crank arm 92 which engages the actuator shaft 16<sup>a</sup> and is oscillated therewith through one-third of a revolution, as indicated in Fig. 12. A link or connector 93 is pivoted at its upper end to crank 92 and is preferably doubled or formed of two similar members as shown in enlarged scale in Fig. 14, the upper ends of which are arranged on opposite sides of the crank 92. The lower ends of the members of the connector link 93 extend on opposite sides of one arm of a bell crank 94 and are provided with a cross pin 95 engaging a slot 96 in the arm of the bell crank. The bell crank 94 is pivotally mounted in the supplemental operating section upon a stud 97 and its upper arm is connected by a pair of parallel links 98 (see Figs. 12 and 13) to the lower end of an oscillating lever 99 which is pivotally mounted intermediate its ends in the main operating section upon a stud 100. The oscillating lever 99 is double, as shown in Fig. 13, and its upper arms extend on opposite sides of a rack 101 and are connected thereto by links 102. The rack 101 is mounted to slide longitudinally upon a pair of flanged rollers 103 upon studs 104 and meshes with a series of gears 105 that are journaled in the supplemental operating section. The actuator shafts 16 extend through the hubs 106 of these gears, which hubs project rearwardly through the plates 58 of the main operating section, as shown in Fig. 2 and are notched at their ends to engage pins 107 on the shafts 16 so that the shafts are oscillated with the gears 105.

The operating mechanism is shown in Figs. 12 and 15 in the position occupied by the different parts when the voter is admitted to the machine. After he has indicated his vote the main operating carriage is shifted and oscillates the actuator shaft 16<sup>a</sup> through one turn of a revolution in the direction of the arrow shown in Fig. 12, by means of the connections described between the carriage and this shaft. This shift of the shaft 16<sup>a</sup> operates through the medium of the link or connector 93, bell crank 94, link 98 and lever 99 to shift the rack 101 and oscillate the actuator shafts 16 of the several counters to advance the counters of the voted keys. By variably positioning the lower end of the link or connector 93 and the slot 96, the bell crank 94 and rack 101 may be variably shifted to different extents to advance the counters in the "cumulative" multi-candidate group one or more steps. In the form shown, the upper edge of the slot 96 in the bell crank 94 is provided with three notches or seats 108 which are engaged by the pin 95 on the link 93 when the latter is shifted by the oscillation of the shaft 16<sup>a</sup>. When the pin engages the outermost notch, the leverage is such, in the form shown, that the gears 105 and actuator shafts 16 will be rotated through one-third of a revolution, when the pin 95 is in the second notch 108 it would shift the actuator shafts and actuators carried thereby through one-half of a revolution and when it is in the innermost notch it will shift the actuator shafts and actuators through a complete revolution. The actuators 8<sup>a</sup> (see Figs. 7 and 9) of the "cumulative" voting mechanisms will thus advance the corresponding counters either two, four or six steps with the form shown, since the actuators 8<sup>a</sup> are geared in the ratio of two to one to the shafts 16.

The pin 95 is variably positioned within the slot 96 by means of a pair of links 109 connected thereto and to the upper end of a crank arm 110 arranged within the supplemental operating section upon the rear end of a shaft 111. This shaft extends through the machine from front to rear and is provided within the machine with an upwardly projecting arm 112 which is arranged to engage the end block 50<sup>c</sup> (see Figs. 1 and 6) of the connected group of blocks associated with the keys 3<sup>a</sup> in the "cumulative" multi-candidate group. The arm 112 is adjustably secured to the shaft 111 by a set screw 113 extending through its hub so that it may be positioned at the proper point in accordance with the position of the "cumulative" group in the machine. The rear end of the shaft 111 extends through the main operating section and is provided at its outer end with a crank arm 114 to the upper end of which is fixed a spring 115. The other end of the spring is secured to a fixed pin 116 on the rear wall of the main operating section. The spring tends to oscillate the shaft 111 and the arms connected thereto in the direction indicated by the arrows in Figs. 1, 12 and 15, so that the spring tends to take up any lost motion or slack in the interlocking mechanism of the "cumulative" group. The shaft 111 and the parts connected thereto are held in the position shown in the drawings when the voter is within the booth by a pin 118 on the crank arm 62 of the main operating shaft 61. This pin engages one arm of a bell crank 119 that is loosely mounted on the rear end of the main operating shaft 61. The other arm of the bell crank is connected by a link 120 to a lever or swinging arm 121 that is pivoted intermediate its ends upon a stud 122 fixed to the rear wall of the main operating section. The arm 121 is connected by a link 123 to the arm 114 on the shaft 111 and when the operating mechanism is in the position shown in Fig. 12 and in Fig. 15, pin 118 engages the bell crank 119 and holds the shaft 111 in the position shown, with the pin 95 at the lower end of the shiftable connector or link 93 at the outer end of the slot 96 of the bell crank 94.

The arm 110 not only variably positions the shiftable contact 93 to control the variable operation of the regular voting devices or counters, but also serves to variably shift a recording device associated with the irregular voting mechanisms. This recording device in the form shown, comprises a segmental pointer or impression device 124 arranged within the supplemental operating section and pivotally mounted upon a slide 125 that is arranged to shift between guide rolls 126. The slide is connected by a link 127 to a crank arm 128 on the main actuator shaft 16ª, and is reciprocated thereby as the latter oscillates to advance and retract the impression device 124 so as to mark the irregular paper ballot, if any is inserted by the voter in the slot 45 of the machine. The variable recording device 124 is provided with three type for recording respectively, in the particular form shown, one, one and one-half and three votes upon the irregular ballot. The marking ribbon 44 of the machine extends between this recording device and any paper ballot in the slot 45. The recording device is connected by a pair of links 129 to a pair of bell cranks 130 on the pivot stud 97, and these latter are connected by links 131 to the crank arm 110 on the shaft 111.

In the normal position shown, the main operating carriage is at the right hand side of the machine when viewed from the rear, as in Fig. 15. The voter, through the medium of the handle 60, oscillates the shaft 61 and parts connected thereto to shift the carriage to the left and the parts into the position shown in the drawings. The movement of the carriage toward the left trips a latch 132 and releases the judge's intervening bar 73 so that the judge or other officer of election may shove the latter in to shift the locking and restoring bar 72 and thus release the several locking and restoring shafts 25 and all of the ballot indicators or keys of the machine. This shift of the carriage moves the bell crank 70 to the position shown in Fig. 15 to permit the releasing shift of the bar 72 and to shift the fingers 87 into the slot 45, so as to uphold any irregular ballot inserted into the machine by the voter. This initial shift of the carriage also oscillates the main actuator shaft 16ª to move the crank arm 92 from the position shown in dotted lines to that shown in full lines in Fig. 12. Moreover, the oscillation of the main operating shaft to release the machine brings the pin 118 into engagement with the bell crank 119 and shifts the latter and the parts connected thereto from the position shown in dotted lines in Figs. 12 and 15 to that shown in full lines, so that the bell crank 94 is shifted to move the rack 101 toward the right and rotate all of the actuator shafts and actuators mounted thereon, backward or toward the left. This movement of the actuators does not affect the counters, since as stated, the actuator teeth are normally out of line with the intermittent gears on the units wheel of the counters 7 and 7ª. The actuators cannot possibly be moved into line with the counters during this preliminary shift because the actuators cannot be shifted in axial direction to bring them into operative relation with their counters until the keys have been first unlocked through the medium of the judge's intervening bar 73 and the latter is not unlocked until the carriage completes its movement toward the left. The voter may then indicate his ballot upon the machine, both for the regular indicators and for those in the "cumulative" group, by depressing the proper ballot indicators or keys. He may also, if he desires, write the names of any irregular candidates upon a special paper ballot and insert the same in the slot 45 of the machine and vote for such candidates by operating the irregular ballot indicators or keys which correspond to the offices, both ordinary and "cumulative" for which he desires to cast an irregular or independent vote or votes. The regular candidate indicators or keys 3 and 3ª for the ordinary and "cumulative" voting, will shift the corresponding actuators 8 and 8ª axially into operative relation with their counters. The irregular ballot indicators or keys 3ᵇ will connect the corresponding impression devices or printers 40 with their actuators 41. All of the keys and parts controlled thereby are freely movable to and from voted position so that the voter may correct or change his vote. The number of ballot indicators or keys which may be operated by the voter are properly limited by the interlocking mechanism so that the voter cannot cast more votes than he is entitled to under the law.

After he has properly set the ballot indicators or keys to voted position, he will return the operating carriage and parts controlled thereby to normal position through the medium of the handle 60 and main operating shaft 61. The restoring shift or the carriage will oscillate the bell crank 69 which, through the connections described, will oscillate the main actuating shaft $16^a$ through one-third of a revolution. This will advance and retract the printer actuators 41 and if any of the irregular ballot indicators or keys $3^b$ have been voted, the irregular ballot inserted in the machine will be correspondingly marked. The recording device 124 will also be shifted to mark the irregular ballot. The movement of the actuator shaft $16^a$ will also, through the medium of the connector link 93, bell crank 94, link 98 and lever 99, shift the rack 101 toward the left (when viewed as in Fig. 12) to oscillate the actuator shafts 16 in forward direction or toward the right. This movement will oscillate all of the actuators and advance the counters corresponding to the actuators and keys which have been left in voted position. The return shift of the carriage will also shift the bell crank 70, thus shifting the locking and restoring bar 72 to oscillate the shafts 25 and restore any of the shifted keys and actuators to normal position and lock them in such position until the next voter is admitted to the machine. The return shift of the locking bar 70 also restores the irregular voting keys through the medium of the lever 80 and link 81 and will also shift the fingers 87 to permit the irregular ballot, if one is deposited in the machine by the voter, to fall through the slot 45 into the bottom portion of the machine frame. The machine is then ready for operation by the next succeeding voter. It will be understood of course that the voter may, if he desires, shift all of the keys or ballot indicators in any one party column to voted position through the medium of one of the cranks or party indicators 26 on the forward ends of the shafts 25. The cam slots in the plate 67 are of course, so arranged that the advancing movement of the actuators takes place before the restoring mechanism is operated.

The particular form of "cumulative" voting mechanism set forth is designed for use in the State of Illinois where three assemblymen are elected from each district at each election and where, in accordance with the law as construed by the election officials, the voter may give all three votes to a single candidate, or one and one-half votes to each of two candidates or one vote to each of three candidates. In using the paper ballot in Illinois, a cross opposite the name of one of the candidates for assemblymen gives the candidate three votes. A cross opposite the names of two candidates gives them each one and one-half votes and a cross opposite the names of three candidates gives them each a single vote. Where a man votes a straight ticket by placing a cross in the circle at the top of any party column, it will give the candidates of that party each one vote, if three are nominated or one and one-half votes each if only two are nominated, or three votes if the party has only a single candidate. Any other marking of the ballot is held by the election officials to be improper. The present "cumulative" voting mechanism is designed to be operated in much the same manner as the paper ballot is now marked, except of course, that provision is made whereby it is impossible to cast a defective ballot. That is to say, if the voter indicates but one of the candidates by depressing a single ballot indicator or key in a "cumulative" voting group, that candidate will be given three votes. If he depresses two of the ballot indicators or keys, each of the corresponding candidates will be given one vote and a half, whereas if he depresses three keys in the group, each of the candidates will be given a single vote.

The interlocking mechanism for the "cumulative" group described is so arranged that only three indicators or keys can be set in voted position. If three keys or indicators are so set in voted position, the lost motion in the connected series of interlocking blocks will be taken up and the engagement of the end block with the arm 112 on the shaft 111, will lock the shaft and the parts connected thereto against movement so that the shiftable connecting member 93 will be held in the position shown in full lines in Fig. 12, with its pin 95 in the outer end of the slot 96 of the bell crank 94. The shift of the bell crank effected by the operating mechanism through the medium of the actuator shaft $16^a$ as the voter leaves the machine, will then be only sufficient to advance the actuator shafts and ordinary actuators one-third of a revolution, and the ordinary counters corresponding to the voted keys will be advanced one step while the actuators of the "cumulative" voting mechanisms will be advanced two-thirds of a revolution and the three counters corresponding to the three voted keys in the "cumulative" group will be advanced two steps. This will however, only record a single vote for each of the three candidates voted for in the "cumulative" group, since it is necessary, as hereinafter explained, to divide the total shown by the counters in this group by two in order to obtain the vote for any candidate.

If the voter indicates his choice for two candidates only in the "cumulative" group by depressing two ballot keys or indicators, there will be a certain amount of lost motion or slack in the interlocking mechanism for the group which will permit the shift of the arm 112 and shaft 111 when the main operating shaft and parts connected thereto, are shifted from the position shown in full lines in Fig. 15, since the pin 118 is then moved away from the bell crank 119 and spring 115 can come into play to shift the shaft 111 in the direction indicated by the arrows in Figs. 1 and 12. If only two of the ballot indicators or keys and corresponding interlocking spreaders in the "cumulative" group have been operated, the spring 115 will move the shaft 111 and the parts connected thereto, far enough to move the shiftable link or connector member 93 to bring the pin 95 in line with the center notch in the upper edge of the slot 96. The shift of the main operating shaft 16ª will then move the bell crank 94 and parts operated thereby a sufficient distance to rotate the actuator shafts through one-half of a revolution. The actuators 8 of the ordinary voting mechanisms will be correspondingly rotated through a half revolution while the actuators of the "cumulative" voting mechanisms will be rotated through an entire revolution and the counters corresponding to the two voted keys will be advanced three steps to record a vote and one-half for each of the candidates voted for. If but a single key or ballot indicator in the "cumulative" group is set in voted position, or if none are voted, the lost motion in the interlocking mechanism for the "cumulative" group will permit the spring 115 to move the variably shiftable member 93 through the medium of the connections described, into position with the pin 95 thereon at the inner end of the slot 96. The shift of the main actuator shaft 16ª will then move the bell crank 94 far enough to oscillate the actuator shafts 16 through an entire revolution. The actuators 8 of the ordinary counters will also be advanced an entire revolution, but will produce no additional movement of the ordinary counters which have been selected or indicated by the voter. The actuators 8ª in the "cumulative" group will however, be rotated through two revolutions and the counter corresponding to the single voted indicator or key will be advanced six steps to record three votes.

The variable shift of the actuator shafts 16 will not affect the operation of the ordinary counters since the single teeth of the ordinary actuators 8 are arranged to operate upon their counters during the first part of their revolution, and as they are never rotated through more than a complete revolution, the ordinary counters can never be advanced more than a single step at a time, no matter whether the actuator shafts are shifted through one-third, one-half or through a complete revolution. The three toothed actuators 8ª of the "cumulative" voting mechanisms which are geared to the actuator shafts in the ratio of two to one, are advanced through two-thirds, one, or two revolutions by the variable shift of the actuator shafts to advance the corresponding counters two, three or six steps and record one, one and one-half and three votes. Because of the fractional vote one and one-half permitted in Illinois, it is necessary to advance the counters two steps for each vote or one step for each half vote.

For properly recording the votes in the "cumulative" multi-candidate group through the medium of the straight ticket or party indicators, the rock arms 19 and 19ª, as shown in Figs. 1 and 5, are employed. When a key is provided with a rock arm 19 it will be operated with the party indicator or crank 26 and when it is provided with a rock arm 19ª, which is similar to the rock arm 19 except that the lug 24 is cut away, the key will not be operated by the party indicator. Where a party has three candidates in the "cumulative" multi-candidate group, the three keys corresponding to the candidates in the party columns will be provided with rock arms such as 19, so as to be operated with the party indicator to record a single vote for each of the candidates when the party indicator is operated. Where a party has but two candidates only two of the keys will be so connected, the other idle keys being disconnected from straight ticket shafts by providing them with rock arms such as shown at 19ª in Fig. 5, and if a party has but a single candidate, his key alone of the keys in the multi-candidate group will be arranged for operation by the party indicator, so that three votes will be recorded for that candidate when the party indicator or key is actuated.

The variable shift of the shaft 111 and arm 110 thereon effected by the spring 115, will also variably position the recording device or printer 124 that is associated with the irregular voting mechanisms. That is to say, if a voter votes for three candidates in the "cumulative" group, all of which are for irregular or independent candidates, or part of which are for regular and part for irregular candidates, all of the lost motion or slack in the interlocking mechanism between the regular and irregular keys in the "cumulative" group will be taken up and the shaft 111 and arm 110 will be held against movement so that the recording device or printer 124 will be held on the position shown in Fig. 12 and will, when shifted by the movement of the main actuator shaft 16², stamp the irregular ballot inserted in the slot 45 with the numeral 1 to show that each candidate voted upon the irregular ballot for the "cumulative" office should be given one vote. If the voter selects or indicates but two candidates in the "cumulative" office, one or both being for irregular or independent candidates, the recording device 124 will be shifted one step and will mark the irregular ballot thus used with the numeral 1½ to show that each candidate voted on the irregular for the "cumulative" office should receive one and one-half votes. If the voter cast his ballot for one candidate only in the "cumulative" group and that an independent or irregular candidate, the recording or printing device 124 will be shifted through two steps by the spring 115 and the parts connected thereto and the intermediate connections and numeral 3 will be stamped upon the irregular ballot to show that the candidate thus voted for should be given three votes.

With the variably operable voting devices, both regular and irregular, described, the voter will cast three votes for a single candidate if he indicates but one, or one and one-half for each of two selected candidates, either regular or irregular, or one vote for each of three selected candidates. He cannot however, cast more than three votes, nor can he distribute the votes in any other manner than as above indicated.

Whether the voter operates one, two or three keys in the "cumulative" group, they are of course restored, after the corresponding counters have been properly advanced, by the shift of the bar 72 and restoring and locking shafts 25. It is immaterial, so far as the operation of the machine by the next succeeding voter is concerned, whether the voter operates one, two or three keys in the "cumulative" group, since the shift of the actuator shaft 16ᵃ and the crank arm 92 thereon and the shift of the pin 118 against the bell crank 119, when the next succeeding voter is admitted to the machine, will move the shaft 111 and parts connected thereto to the position shown in full lines in Figs. 12 and 15 with the pin 95 in the outer end of the slot 96 of the bell crank 94, ready for operation by the voter.

The special "cumulative" voting mechanisms may be readily changed to operate like ordinary counters by substituting a single toothed actuator 8ᵇ for the three toothed actuator 8ᵃ, so that the same machine may be readily adopted for all elections, whether or not candidates to the "cumulative" office are to be elected. When the special voting mechanisms are employed for ordinary voting the shaft 111 and parts connected thereto are locked, in any suitable manner, in the position shown in full lines in Figs. 12 and 15, so that the pin 95 upon the connector link 93 always remains in the outer end of the slot 96 and the bell crank 94 is moved at each operation, sufficiently to advance the actuator shafts one-third of a revolution. Shaft 111 may be locked in any suitable manner, for example, by means of a dogging device 133 shown in dotted lines in Fig. 15 which fits over the square outer rear end of the shaft 111 and abuts against the side wall of the casing to hold the shaft and parts connected thereto, in the position shown in full lines with the spring 115 held under tension.

The operating mechanism at the back of the machine is inclosed by a removable plate 134 (see Fig. 2). When this back door or plate is removed the actuator shaft 16 may be shifted longitudinally to a slight extent to disengage the pins 107 thereon from the hub 106 of the gears 105. The counters may then be quickly restored to zero by depressing the keys successively in the different columns to shift the actuators into operative relation with the counters, and then rotating the shaft 16 by a suitable handle or the like. The plate 134 cannot be placed in position upon the machine unless the actuator shafts are all properly engaged with the operating gears 105. The sets of shafts 16, 25 and 48 are normally held in position but may be removed from the sections so that the machine may be readily assembled or taken apart for repairs and the like.

It is obvious that wide and numerous changes may be made in the details of structure set forth without departure from the broad scope of the invention as defined in the claims. If a retractile interlocking mechanism were employed, spring 115, crank 114 and the other parts connected to the crank could be omitted and the connecting link 93 directly positioned by the interlocking mechanism.

Having described my invention, what I claim as new and desire to secure by Letters Patent, is:—

1. In a voting machine, the combination with a series of candidate counters and a corresponding series of voters' keys, one for each counter, of means controlled by said keys for variably actuating said counters to register different numbers of votes at each operation.

2. In a voting machine, the combination with a series of candidate counters, a corresponding series of voters' keys and key controlled counter actuators, one key and one actuator for each counter, of mechanism controlled by said keys for effecting the variable operation of said actuators upon said counters to advance the latter one or more steps at each operation.

3. In a voting machine, the combination with a series of candidate counters, of a series of voters' keys and key controlled counter actuators therefor, one key and one actuator for each counter, interlocking mechanism between said keys and mechanism controlled by said keys for effecting the variable operation of said actuators upon said counters to advance the latter one or more steps at each operation.

4. In a voting machine, the combination with a Geneva stop counter, of a Geneva stop actuator constantly interlocked with said counter, a key for effecting the relative shift of said counter and actuator into and out of operative position and mechanism for effecting the variable operation of said actuator upon said counter to advance the latter one or more steps at each operation.

5. In a voting machine, the combination with a rotary Geneva stop counter, of a rotary Geneva stop actuator constantly interlocked with said counter, a key for effecting the relative shift of said actuator in axial direction into and out of operation with said counter and mechanism for variably rotating said actuator to advance said counter one or more steps at each operation.

6. In a voting machine, the combination with a series of voting devices under the voter's control and means for variably advancing said voting devices to register different numbers of votes at each operation in accordance with the number of devices operated by the voter.

7. In a voting machine, the combination with a series of voting devices under the voter's control and comprising a series of counters having units and tens wheels and counter actuators, of mechanism controlled by the preliminary setting of said voting devices in voting position for effecting the variable operation of said actuators upon said counters to advance the latter one or more steps through their units wheel at each operation, in accordance with the number of voting devices operated by the voter.

8. In a voting machine, the combination with a series of counters, counter controlling keys and interlocking mechanism for limiting the number of keys operated by the voter arranged in multi-candidate group, of operating mechanism controlled by said interlocking mechanism for variably advancing the counters corresponding to the voted keys one or more steps.

9. In a voting machine, the combination with a series of counters, counter controlling keys and interlocking mechanism for limiting the number of keys operated by the voter arranged in multi-candidate group, of operating mechanism including a variably shiftable member controlled by said keys for advancing the counters corresponding to the voted keys one or more steps at each operation.

10. In a voting machine, the combination with a series of counters, counter controlling keys and interlocking mechanism for limiting the number of keys operated by the voter arranged in multi-candidate group, of operating mechanism including a variably shiftable member controlled by the slack or lost motion in said interlocking mechanism for variably actuating the counters corresponding to the voted keys one or more steps at each operation.

11. In a voting machine, the combination with a series of counters and a corresponding series of counter controlling keys arranged in multi-candidate group and with interlocking mechanism for limiting the number of keys operable by the voter to a predetermined number, of mechanism for simultaneously advancing the counters corresponding to the keys set in voted position, said mechanism including a variable member controlled by the preliminary setting of said keys and interlocking mechanism whereby the operated counters will be advanced one or more steps in accordance with the number of keys set in voted position.

12. In a voting machine, the combination with a series of counters and counter actuators arranged in multi-candidate group, of a series of keys controlling said actuators, interlocking mechanism for limiting the number of keys operable by a single voter, mechanism for effecting the operation of the actuators of the voted keys to advance the corresponding counters, said mechanism including a variably shiftable connector controlled by said interlocking mechanism and set in position in accordance with the amount of slack or lost motion therein, whereby the actuated counters will be advanced one or more steps in accordance with the number of keys operated by the voter.

13. In a voting machine, the combination with a series of counters and counter actuators arranged in multi-candidate group, of keys movable to and from voted position for controlling said counter actuators, interlocking mechanism interposed between said keys for limiting the number operable by a single voter, mechanism for simultaneously operating the actuators of the voted keys to advance the corresponding counters, said mechanism including a variably shiftable connector link operatively connected to and controlled by said interlocking mechanism, whereby the operated connectors will be advanced one or more steps at each operation in accordance with the number of voted keys in the group.

14. In a voting machine, the combination with a series of counters and counter actuators arranged in multi-candidate group, of a series of keys movable by the voter into and out of voted position for shifting said counters and actuators into and out of operative relation, mechanism for simultaneously effecting a relative shift of said counters and counter actuators, whereby the counters corresponding with the voting keys will be advanced, said mechanism being variably shiftable to advance the operated counters one or more steps, interlocking mechanism interposed between said keys for limiting the number operable by a single voter and means controlled by said interlocking mechanism for determining the shift of said operating mechanism.

15. In a voting machine, the combination with a series of counters and rotary counter actuators, of a series of keys movable by the voter into and out of voted position for shifting said actuators axially into and out of operative relation with said counters, a series of shafts whereon said actuators are mounted, operating mechanism for variably shifting said shaft and actuators to advance the counters corresponding to the voted keys one or more steps at each operation, interlocking mechanism comprising interlocking blocks and spreaders operated by said keys for limiting the number of keys operable by a single voter and means controlled by said interlocking mechanism for determining the shift of said operating mechanism.

16. In a voting machine, the combination with a series of regular voting devices and a series of irregular voting devices arranged in multi-candidate group, of a series of ballot indicators for said voting devices, interlocking mechanism for limiting the number of ballot indicators operable by the voter and mechanism for variably operating said voting devices to record one or more votes for each candidate indicated by the voter in accordance with the number so selected.

17. In a voting machine, the combination with a series of regular counters and a series of irregular voting mechanisms arranged in multi-candidate group, of a series of ballot indicators controlling said counters and said irregular voting mechanisms, interlocking mechanism for limiting the number of indicators operable by a single voter, a variably shiftable device for recording different numbers of votes associated with said irregular voting mechanisms and mechanism for variably operating said recording device and the indicated counters to register one or more votes for the selected candidates in accordance with the number of indicators operated by the voter.

18. In a voting machine, the combination with a series of regular counters and a series of irregular voting mechanisms arranged in multi-candidate group, of a series of ballot indicators controlling said counters and said irregular voting mechanisms, interlocking mechanism for limiting the number of indicators operable by a single voter, a variably shiftable device for recording different numbers of votes associated with said irregular voting mechanisms and mechanism for variably operating said recording device and the indicated counters to register one or more votes for the selected candidates in accordance with the number of indicators operated by the voter, said operating mechanism including a variably shiftable member controlled by said interlocking mechanism for determining the extent of shift of said recording device and the operated counters.

19. In a voting machine, the combination with a series of regular candidate counters and a series of irregular candidate impression devices arranged in multi-candidate group, of a series of ballot indicators controlling the operation of said counters and said impression devices, interlocking mechanism for limiting the number of indicators in the group operable by a single voter, a variable impression device for recording different numbers of votes associated with said irregular impression devices and operating mechanism controlled by said interlocking mechanism for advancing said counters and said variable impression device one or more steps in accordance with the number of indicators operated by the voter.

20. In a voting machine, the combination with a series of counters for regular candidates and a series of printers for irregular candidates arranged in multi-candidate group, of a series of keys movable by the voter into and out of voted position for controlling said counters and said printers, interlocking mechanism interposed between said keys for limiting the number in the group operable by a single voter, a variably shiftable printer for recording different numbers of votes associated with said irregular printers and operating mechanism controlled by said interlocking mechanism for advancing the selected counters and variably shiftable printer one or more steps in accordance with the number of indicators left in voted position.

21. In a voting machine, the combination of a series of voting devices arranged in multi-candidate group, each of said voting devices being variably operable to register a different number of votes at each operation and means coöperating therewith for preventing the registration of more than a predetermined number of votes by a single voter.

22. In a voting machine, the combination of a series of counters and counter controlling indicators or keys arranged in multi-candidate group, each of said counters being variably operable to register a different number of votes at each operation and means coöperating with said keys and counters for limiting the number of votes which may be cast by a single voter to a predetermined number, whereby the voter may cast all of his votes for a single candidate or distribute the same equally among a number of candidates.

23. In a voting machine, the combination of a series of counters arranged in multi-candidate group, each of said counters being variably operable to register one, one and one-half or three votes and interlocking mechanism coöperating with said counters for limiting the total number of votes to be cast by a single voter for the candidates in the group to three.

24. In a voting machine, the combination of a series of voting devices arranged in multi-candidate group, each of said voting devices being variably operable to register one, one and one-half or three votes at a single operation, a series of controlling ballot indicators or keys for said voting devices, interlocking mechanism for preventing the operation of more than three of said controlling ballot indicators or keys and operating mechanism for variably advancing the voting devices corresponding to the selected indicators or keys to register one, one and one-half or three votes in accordance with the number of indicators or keys selected by the voter.

25. In a voting machine, the combination with a series of candidate counters and a series of voters' keys, one for each counter, of variably acting operating mechanism controlled by said keys arranged to uniformly advance certain of said counters and to variably advance other of said counters.

26. In a voting machine, the combination with a series of voters' keys and a corresponding series of candidate counters, one for each key, of variably shiftable operating mechanism controlled by said keys, arranged to uniformly operate certain of said counters and to variably operate other of said counters and interlocking mechanism between said keys.

27. In a voting machine, the combination with a series of candidate counters and a corresponding series of voters' keys, one for each counter, of a series of actuators for said counters and variably acting mechanism for effecting the operation of said actuators upon said counters, said actuators and said operating mechanism being controlled by said keys, certain of said actuators being arranged to uniformly operate the corresponding counters and certain of said actuators being arranged to variably operate other of said counters.

28. In a voting machine, the combination with a series of counters and a corresponding series of voters' keys, of a series of actuators for said counters controlled by said keys, variably acting mechanism for effecting the operation of said actuators upon said counters, means controlled by said keys for determining the shift of said operating mechanism, certain of said actuators being arranged to uniformly operate the corresponding counters and other of said actuators being arranged to variably operate the corresponding counters.

29. In a voting machine, the combination with a series of candidate counters and a corresponding series of voters' keys, one for each counter, of a series of counter actuators controlled by said keys, of variably acting mechanism controlled by said keys for effecting the operation of said actuators upon said counters, said actuators having different numbers of teeth and certain of said actuators being arranged to uniformly operate the corresponding counters, while other of said actuators variably operate the corresponding counters.

30. In a voting machine, the combination with a series of counters, voters' keys and interlocking mechanism therefor arranged in multi-candidate group, of operating mechanism for variably advancing said counters and means controlled by the lost motion of said interlocking mechanism for determining the shift of said operating mechanism.

31. In a voting machine, the combination with a series of counters, voters' keys, interlocking blocks and spreaders therefor connected to said keys, all of said parts being arranged in multi-candidate group, mechanism controlled by said keys for variably advancing said counters, a shifter having a uniform throw for operating said mechanism and means controlled by the lost motion in said group of interlocking blocks for variably connecting said shifter and said mechanism.

32. In a voting machine the combination of counters operable through a variable number of steps, a key for each of said counters controlling the operation thereof, each of said counters being operated upon the operation of its key, the extent of the operation of each counter whose key has been operated being dependent inversely upon the number of additional keys that are operated in association with its particular key.

33. In a voting machine the combination of a plurality of counters and a key for each of said counters, upon which key the operation of said counter is dependent, means for causing the uniform operation of all the counters whose keys have been operated, said means moving to cause the operation of said counters an extent inversely proportional to the number of keys operated.

34. In a voting machine the combination of a plurality of counters and a key for each of said counters, upon which key the operation of said counter is dependent, means for causing the uniform operation of all the counters whose keys have been operated, said means moving to cause the operation of said counters an extent inversely proportional to the number of keys operated, means connecting said keys to said operating means to control the operation of said operating means by the aggregate number of keys operated.

35. In a voting machine the combination of counters, a key for each counter, actuators for each counter controlled by the key thereof, pinions for driving said actuators, and a rack bar for driving said pinions, and connections between said keys and said rack bar for causing said rack bar to travel a distance inversely proportional to the number of keys operated.

36. In a voting machine the combination of counters, a key for each counter, actuators for each counter controlled by the key thereof, pinions for driving said actuators, and a rack bar for driving said pinions, connections between said keys and said rack bar for causing said rack bar to travel a distance inversely proportional to the number of keys operated, and means for limiting the number of keys that can be operated.

37. In a voting machine the combination of counters, a separate key for each of said counters, the operation of each of said counters being dependent upon its key, means for operating said counters whose keys have been set in operative position, said means driving said counters to an extent inversely proportional to the number of counters being driven thereby.

JAMES H. DEAN.

Witnesses:
LILLIAN PRENTICE,
KATHARINE GERLACH.

---

Copies of this patent may be obtained for five cents each, by addressing the "Commissioner of Patents, Washington, D. C."